(12) United States Patent
Goldman et al.

(10) Patent No.: US 10,922,779 B2
(45) Date of Patent: Feb. 16, 2021

(54) TECHNIQUES FOR MULTI-MODE GRAPHICS PROCESSING UNIT PROFILING

(71) Applicant: INTEL CORPORATION, Santa Clara, CA (US)

(72) Inventors: Orr Goldman, Kibbutz Harel (IL); Konstantin Levit-Gurevich, Kiryat Byalik (IL); Michael Berezalsky, Tirat Carmel (IL); Noam Itzhaki, Yokneam Elit (IL); Arik Narkis, Kiryat Tivon (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/235,304

(22) Filed: Dec. 28, 2018

(65) Prior Publication Data

US 2019/0139183 A1  May 9, 2019

(51) Int. Cl.
| | |
|---|---|
| *G06T 1/20* | (2006.01) |
| *G06F 9/30* | (2018.01) |
| *G06F 9/38* | (2018.01) |
| *G06T 15/00* | (2011.01) |

(52) U.S. Cl.
CPC ............ *G06T 1/20* (2013.01); *G06F 9/30145* (2013.01); *G06F 9/3877* (2013.01); *G06T 15/00* (2013.01); *G06T 15/005* (2013.01)

(58) Field of Classification Search
CPC .............. G06F 9/30145; G06F 9/3877; G06F 9/45525; G06F 9/5055; G06F 11/3409; G06F 11/3466; G06T 1/20; G06T 15/00; G06T 15/005

USPC .................................................. 345/501, 503
See application file for complete search history.

(56) References Cited

U.S. PATENT DOCUMENTS

| | | | | |
|---|---|---|---|---|
| 9,691,123 | B2 * | 6/2017 | Wang ................... | G06F 11/3636 |
| 2008/0301650 | A1 * | 12/2008 | Talluri ................ | G06F 11/3409 717/135 |
| 2010/0146220 | A1 * | 6/2010 | Panchenko ......... | G06F 11/3471 711/154 |
| 2014/0298307 | A1 * | 10/2014 | Johnson .................. | G06F 8/443 717/158 |
| 2015/0205586 | A1 * | 7/2015 | Diamos ..................... | G06F 8/41 717/158 |
| 2015/0248343 | A1 * | 9/2015 | Ionescu ..................... | G06F 8/70 717/130 |
| 2015/0378868 | A1 * | 12/2015 | Levit-Gurevich ......................... G06F 11/3612 714/38.1 |

(Continued)

*Primary Examiner* — Jacinta M Crawford
(74) *Attorney, Agent, or Firm* — Kacvinsky Daisak Bluni PLLC

(57) ABSTRACT

Techniques and apparatus for profiling graphics processing unit (GPU) processes using binary instrumentation are described. In one embodiment, for example, an apparatus may include at least one memory comprising instructions and a processor coupled to the at least one memory. The processor may execute the instructions to determine a plurality of profiling modes for profiling an operating process of a graphics processing unit (GPU) application, access original binary code for the GPU application, and generate a multi-mode instrumented binary code comprising a plurality of instrumentation modes, each of the plurality of instrumentation modes corresponding to at least one of the plurality of profiling modes. Other embodiments are described.

25 Claims, 10 Drawing Sheets

(56) References Cited

U.S. PATENT DOCUMENTS

2019/0034316 A1\* 1/2019 Levit-Gurevich ............................ G06F 11/3409
2019/0146766 A1\* 5/2019 Sandanagobalane ... G06F 8/451 717/157

\* cited by examiner

TECHNIQUES FOR MULTI-MODE GRAPHICS PROCESSING UNIT PROFILING

TECHNICAL FIELD

Embodiments herein generally relate to computer processors, and more particularly, to processes for analyzing applications executed via graphics processing units (GPUs).

BACKGROUND

A graphics processing unit (GPU) provides a parallel hardware environment for implementing high-throughput and/or data-intensive applications, such as graphics processing applications. However, developing executable code that can efficiently and effectively take advantage of GPU technologies requires intensive analysis and tuning of application code. Developers may use a performance profiling tool to determine performance information for an executed application, including multiple operating processes and a plurality of types of profiling types or interests. The performance profiling tool may analyze the performance information to provide a performance evaluation that may be used by a developer to optimize the application.

DETAILED DESCRIPTION

Figure 1:
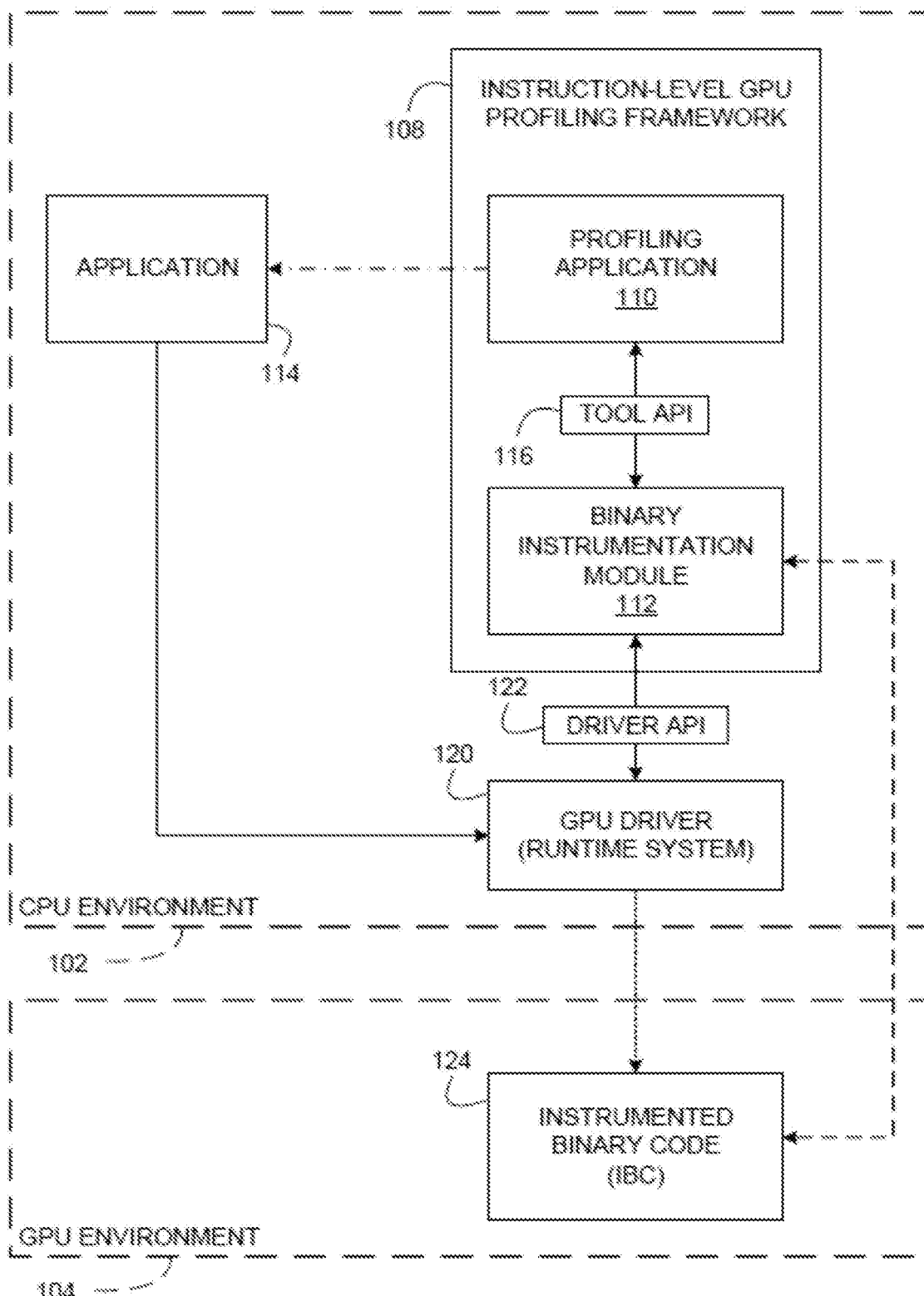
FIG. 1 illustrates an embodiment of a first operating environment.

Various embodiments may be generally directed to techniques to perform analysis processes on graphics processing units (GPUs) using binary instrumentation via a profiling protocol or process. In some embodiments, a binary instrumentation-based GPU profiling process may be provided to profile GPU applications. For example, exemplary embodiments may provide an application programming interface (API) to control profiling of a GPU operating process, such as a kernel, a compute shader, shader application, and/or the like ("shader"). In some embodiments, a profiling process may operate to allow for multi-mode profiling of an operating process. In general, a mode may include a profiling target of an operating process, such as a command, an element (for instance, a graphics element), an instrumentation type, a method, and/or the like. In various embodiments, a profiling process may generate instrumented code with a plurality of profiling modes. The profiling process may execute the instrumented code associated with one or more of the profiling modes. In this manner, a profiling process may analyze one or more profiling modes while eliminating profiling of modes that are not of interest.

GPU applications have become more complex and computationally intensive. Accordingly, efficient and detailed GPU profiling applications have become a growing need for developers. Hardware architects have employed various profiling frameworks, such as GT-Pin for Intel® GPUs. In general, GT-Pin collects profiling data via dynamic binary instrumentation. For example, GT-Pin instrumentation may operate to inject instructions into the assembly code of binaries as it is compiled. As the program executes on the GPU, the insertions may output profiling results. Accordingly, GT-Pin, based on binary instrumentation, may allow for profiling GPU code running on execution units (EUs) at hardware thread granularity.

However, other systems are not able to efficiently or effectively instrument more than one type of profiling on the same operating process. In such other systems, measuring one mode of interest (for instance, number of cycles for a draw command) may interfere with measuring another mode (for instance, execution path of a submit command). For example, using other systems, measuring a number of cycles for a shader to execute while also tracing the path of the shader on a control flow graph is either not possible or will provide a less accurate measurement of one or both modes (for instance, due to extensive memory operations). Other systems typically instrument one type of instrumentation or mode to the code of interest and run an entire application with the instrumented code, profiling continuously. For example, when profiling shader A, all invocations of shader A will be profiled, whether or not the information is of interest for all invocations.

In addition, other systems incur inefficiencies and substantial overhead when attempting to profile different modes of an operating process. For example, if a user seeks to obtain profiling data only for the first N shader draw/submit commands, other approaches do not provide an application programming interface (API) or other access construct to perform such profiling processes. This is even more difficult, for example, if the "stop profiling" criteria are decided on run-time. In another example, if a user seeks to measure different profiling data on different runs of each shader. Current approach doesn't allow this and so to get this information, user must run the profiling application at least twice, once for each profiling data type. Accordingly, these issues, as well as others, associated with other systems cause inefficiencies and resource constraints that lead to a slow-down in profiling. Moreover, to obtain different types of modes of profiling data, other systems user must compile each instrumented shader more than once (for example, because it is required to run the profiling application more than once).

For example, a GT-Pin based applications maintain a "black box" mode that allows for certain control over profiling processes but, ultimately, only provides for single mode (for instance, single instrumentation and/or profiling type) per each workload run. Other solutions, such as NVIDIA® GPU profiling tools (for instance, SASS instrumentor (SASSI)) are also based on "black box" compile-time profiling code that only allow for single mode profiling on a single operating process run. More specifically, other systems do not allow a user to access (for instance, via an API) to decide at and/or during runtime which profiling mode to apply to each operating process (for instance, on each shader per command, such as draw and submit commands), thus requiring additional built-in overhead to analyze different operating modes.

Accordingly, some embodiments may provide for multi-mode profiling of GPU operating processes. In various embodiments, a multi-mode protocol between an instrumentation engine and a driver (for instance, a GPU driver) may facilitate the use of an API to choose the profiling mode. For example, the multi-mode protocol may allow selection of the instrumentation type in a per-shader, per-command (for instance, draw, submit, and/or the like), and/or per type (for instance, operating process cycles, operating process path, operating process data, and/or the like) granularity. By instrumenting the native binary once for each requested profiling data, attached together in a multi-mode instrumentation code element, redundant compilation time may be severely reduced or even eliminated. In exemplary embodiments, existing interfaces with a GPU driver may be employed to provide a user with the ability to collect different types of profiling data of the same operating process (for instance, a shader) at different points of the workload by single workload run.

Accordingly, profiling processes according to some embodiments may, inter alia, save redundant compilation time, reduce slowdown of profiled executable code, and eliminate the need of multiple runs of profiling tool compared to other systems. Embodiments are not limited in this context.

Profiling processes according to some embodiments may facilitate the identification of GPU application issues, such as bottlenecks and hotspots in graphics applications (e.g., a DirectX API, an OpenGL API, a Metal API, etc.) and general purpose (GP) GPU compute applications (e.g., an OpenCL API, a CM API, etc.). Profiling processes according to some embodiments may facilitate dynamic profiling of compiled binary code to be executed on the GPU EUs via user-specified profiling configurations (e.g., in the form of instrumentation schemas).

Profiling processes according to various embodiments may facilitate performance analysis of graphics applications and/or GPGPU applications, and, for example, analysis of the dynamic behavior of the code running on GPU EUs. Profiling processes, GPUs, drivers, and/or the like configured according to some embodiments may be advantageously employed by hardware architects inside GPU design and manufacturing environments, application developers, and/or other GPU stakeholders. For example, hardware architects may implement some embodiments for use in driver/compiler development and optimization (e.g., when developing GPU hardware and/or corresponding firmware and/or drivers), and application developers may employ some embodiments to develop efficient graphics applications and/or GPGPU applications.

FIG. 1 illustrates an embodiment of a first operating environment. As shown in FIG. 1 an operating environment (computing platform or apparatus) 100 may include an example instruction-level GPU profiling framework 108 (e.g., GPU profiling framework) to perform machine instruction-level GPU profiling and/or source code instruction-level GPU profiling based on, for instance, inserting profiling instructions in target object code (e.g., object code to be measured or profiled for performance) using binary instrumentation. The computing platform 100 may include an CPU environment 102 and an GPU environment 104. In some embodiments, the processing units of the CPU environment 102 and/or the GPU environment 104 may be or may include processing circuitry. In various embodiments, the CPU environment 102, the GPU environment 104, and/or elements thereof may be implemented in software, hardware, and/or a combination thereof. In the CPU environment 102, firmware and/or software programs may be executed by a CPU (e.g., an Intel® x86 compatible processor and/or any other processor). In the GPU environment 104, firmware and/or software programs may be executed by a GPU (e.g., an Intel® HD graphics processor, an Intel® Iris graphics processor, and/or the like). The GPU profiling framework 108 may include an example profiling application 110 and a binary instrumentation module 112.

In some embodiments, the GPU profiling framework 108 may be used to profile the GPU performance of one or more operating or graphics processes and/or modes thereof (e.g., a graphics rendering operation, a graphics shader operation, a graphics compute kernel operation, and/or the like, and/or properties thereof, such as cycles, execution paths, data, and/or the like) of an application 114 that employs one or more graphics APIs (e.g., a DirectX API, an OpenCL API, a Metal Compute API, a Metal Graphics API, an OpenGL API, etc.). The application 114 of the illustrated example may be coded in a high-level language (e.g., the C programming language, the C++ programming language, DirectX, OpenCL, Metal Compute, Metal Graphics, OpenGL, and/or the like) as a native application developed to run on the computing platform 100. Being a native application, the application 114 is designed to use features of an operating system and/or graphics software/libraries (e.g., the DirectX API, the OpenCL API, the Metal Compute API, the Metal Graphics API, the OpenGL API, and/or the like) installed on the computing platform 100.

In various embodiments, the GPU profiling framework 108 may be used to instrument object code that was compiled based on source code of the one or more graphics processes of the application 114, for instance, to measure machine instruction-level performance of those graphics process(es) of the application 114. Such performance may be representative of various performance metrics including, without limitation, the number of GPU clock cycles, execution path, generated data, the duration required to execute one or more machine instruction-level operations (e.g., one or more move instructions, one or more add instructions, one or more multiply instructions, one or more shift instructions, etc. and/or combinations thereof) of a compute operation, and/or the like. Non-limiting examples of a compute operation may include a graphics rendering operation, a graphics shader operation, a graphics compute kernel operation, and/or the like of the application 114. In exemplary embodiments, the application 114 need not be aware of the GPU profiling framework 108 and/or the binary instrumentation performed by the GPU profiling framework 108. As such, the application 114 executes in a normal execution mode without being aware of any underlying binary instrumentation being performed to measure its GPU-based performance. In some examples, the application 114 may also include CPU-based programming code that is targeted to run on a CPU in addition to GPU-based programming code that implements the one or more graphics processes for which GPU performance profiling is to be performed by the GPU profiling framework 108.

The profiling application 110 may provide a user interface (e.g., a GUI and/or a command line interface) to allow developers to specify performance measures that are to be collected based on binary instrumentation of target object code, and to display collected profiling data (e.g., performance measures) about the target object code for the developers. Unlike API-level performance profiling of Intel® VTune™ Amplifier Performance Profiler and/or the Intel® Graphics Performance Analyzer, the profiling application 110 may enable users to specify performance parameters that are to be monitored at the instruction level (e.g., a source code instruction level and/or a machine instruction level). In this manner, a user may specify profiling modes for an operating process to be profiled according to some embodiments. The binary instrumentation module 112 may be implemented using a binary instrumentation tool (e.g., the Intel® GT-PIN binary instrumentation tool for Intel® GPUs) that has been adapted to insert machine instructions into complied GPU object code in accordance with various embodiments.

The profiling application 110 and the binary instrumentation module 112 may communicate via a tool API 116. The example tool API 116 may facilitate the profiling application 110 to provide user-specified performance profiling parameters to the binary instrumentation module 112 via high-level programming language statements (e.g., the C programming language, the C++ programming language, and/or the like) or in any other suitable form (e.g., plain text, tabular form, extensible markup language (XML), and/or the like). For example, a user may analyze the application 114 to identify aspects of the application 114 to acquire performance profiling data. In the illustrated example, the user-specified performance profiling parameters provided by users via the profiling application 110 may be used by the profiling application 110 to configure and control the binary instrumentation module 112 by instructing it on the types of machine instruction-level instrumentations to be used and locations in the target object code at which the instrumentations should be made. In some embodiments, the profiling application 110 may analyze the application 114 automatically without manual user analysis of the application 114. In such embodiments, the profiling application 110 may operate in an automated manner to review programming statements, function calls, sub-routines, and/or the like in the application 114 to identify aspects of the code that should be profiled for performance analysis.

The binary instrumentation module 112 may be in communication with a GPU driver 120 via a driver API 122. The example GPU driver 120 may provide the binary instrumentation module 112 with compiled binary object code corresponding to the application 114. In this manner, the binary instrumentation module 112 may instrument the binary object code with profiling instructions at the machine instruction level. Although the GPU driver 120 is shown in the embodiment of FIG. 1, in various other embodiments, a runtime system API may be used instead of the GPU driver 120 to communicate with the binary instrumentation module 112.

In various embodiments, resulting example instrumented binary code 124 may be generated by the binary instrumentation module 112 and provided to a GPU hardware device (e.g., the GPU hardware device 204 of FIG. 2) instead of the original binary code of the application 114 so that EUs of the GPU hardware device can execute the instrumented binary code 124 in the GPU environment 104 instead of the original binary code. In exemplary embodiments, the instrumented binary code 124 may include one or more instrumented renderers, one or more instrumented shaders, one or more instrumented compute kernels, and/or any other types of instrumented graphics operations or sub-routines. While executed on GPU EUs, profiling data generated based on instrumented profiling instructions inserted by the binary instrumentation module 112 in the instrumented binary code 124 may be collected. In some embodiments, the binary instrumentation module 112 may be configured to have interactive communication with GPU environment 104 in which the instrumented binary code 124 is executed so that the binary instrumentation module 112 can dynamically retrieve the generated profiling data in real time during execution of the instrumented binary code 124. The binary instrumentation module 112 may provide the generated profiling data to the profiling application 110 for further processing and analysis. The processed results may then be presented to the user via a graphical user interface. In the illustrated example, since the binary instrumentation module 112 inserts profiling instructions in the instrumented binary code 124 at the machine instruction level, the resulting profiling data is generated at the granularity of individual EUs and corresponding hardware threads.

In some embodiments, the GPU profiling framework 108, the GPU driver 120, the driver API 122, and the instrumented binary code 124 may run on the same processor system. In other embodiments, the GPU profiling framework 108 may run on a separate processor system than the GPU driver 120, the driver API 122, and the instrumented binary code 124.

Figure 2:
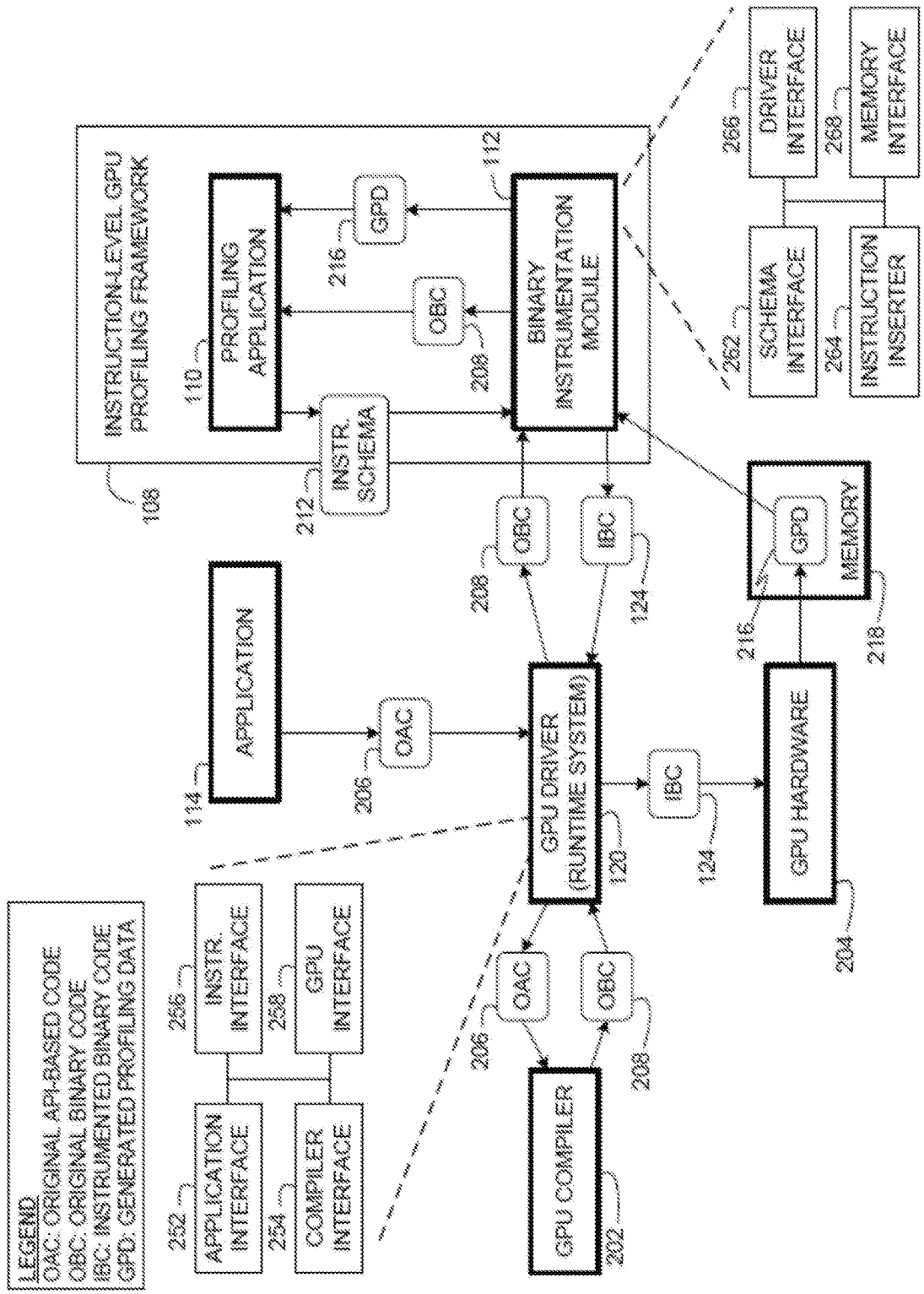
FIG. 2 illustrates an embodiment of a second operating environment.

FIG. 2 illustrates an embodiment of a second operating environment. As shown in FIG. 2, operating environment 200 (computing platform or apparatus) may include the GPU driver 120 of FIG. 1 in communication with the example instruction-level GPU profiling framework 108 of FIG. 1 to perform instruction-level GPU profiling based on binary instrumentation. In the illustrated example, the GPU driver 120 is in communication with the application 114, the binary instrumentation module 112, a GPU compiler 202, and a GPU hardware device 204. The application 114 may include an original non-instrumented application that includes original API-based code (OAC) 206 (e.g., for implementing various compute operations, a graphics renderer, a graphics shader, a graphics compute kernel, and/or the like). The application 114 may communicate with the corresponding GPU driver 120 (or a runtime system API) as defined by the specific graphics API interface(s) (e.g., a DirectX API, an OpenCL API, a Metal Compute API, a Metal Graphics API, an OpenGL API, etc.) used to develop the application 114. The example GPU driver 120 may receive the OAC 206 (e.g., in the form of a file) and provides it to the GPU compiler 202. For example, the OAC 206 may include a flag or value in a header (e.g., a file header) from which the GPU driver 120 can determine that it is non-instrumented source code needing to be compiled.

The example GPU compiler 202 may include a graphics processor compiler that compiles source code such as the OAC 206 to object code based on a target instruction set architecture (ISA) for execution by a target GPU device such as the GPU hardware device 204. In some examples, the example GPU compiler 202 may be implemented as a just-in-time (JIT) compiler that compiles source code (e.g., the OAC 206) during runtime in just-in-time fashion before execution by, for example, the GPU hardware device 204. In the illustrated example of FIG. 2, the GPU compiler 202 receives and compiles the OAC 206 to generate example original binary code (OBC) 208 (e.g., in the form of a file). In the illustrated example, the GPU compiler 202 may be separate from the binary instrumentation module 112. As such, the GPU compiler 202 of the illustrated example does not instrument the OBC 208 with profiling instructions. However, in other examples, the binary instrumentation module 112 may be implemented as part of the GPU compiler 202. After the OAC 206 is compiled, the resulting OBC 208 may be in form for execution by the GPU hardware device 204. In various embodiments, the GPU hardware device 204 may be implemented using an Intel® HD graphics processor, an Intel® Iris graphics processor, and/or any other GPU.

Since the example application 114 is not provided with instrumentation/profiling instructions, the OAC 206 and the OBC 208 resulting from the application 114 of the illustrated example may be referred to as original code because they are not instrumented with profiling instructions that could be used to measure execution performance when the OBC 208 is executed by the GPU hardware device 204. That is, the example application 114 may include software or firmware source code implemented using programming statements, function calls, subroutines, etc. in a high-level language in the original non-instrumented form such as the precompiled OAC 206. However, compilation of the OAC 206 by the GPU complier 202 may generate a binary machine instruction-level representation of the application 114 in the form of the OBC 208 that causes the GPU hardware device 202 to execute the programming statements, function calls, subroutines, etc. programmed in the application 114.

Figure 4:
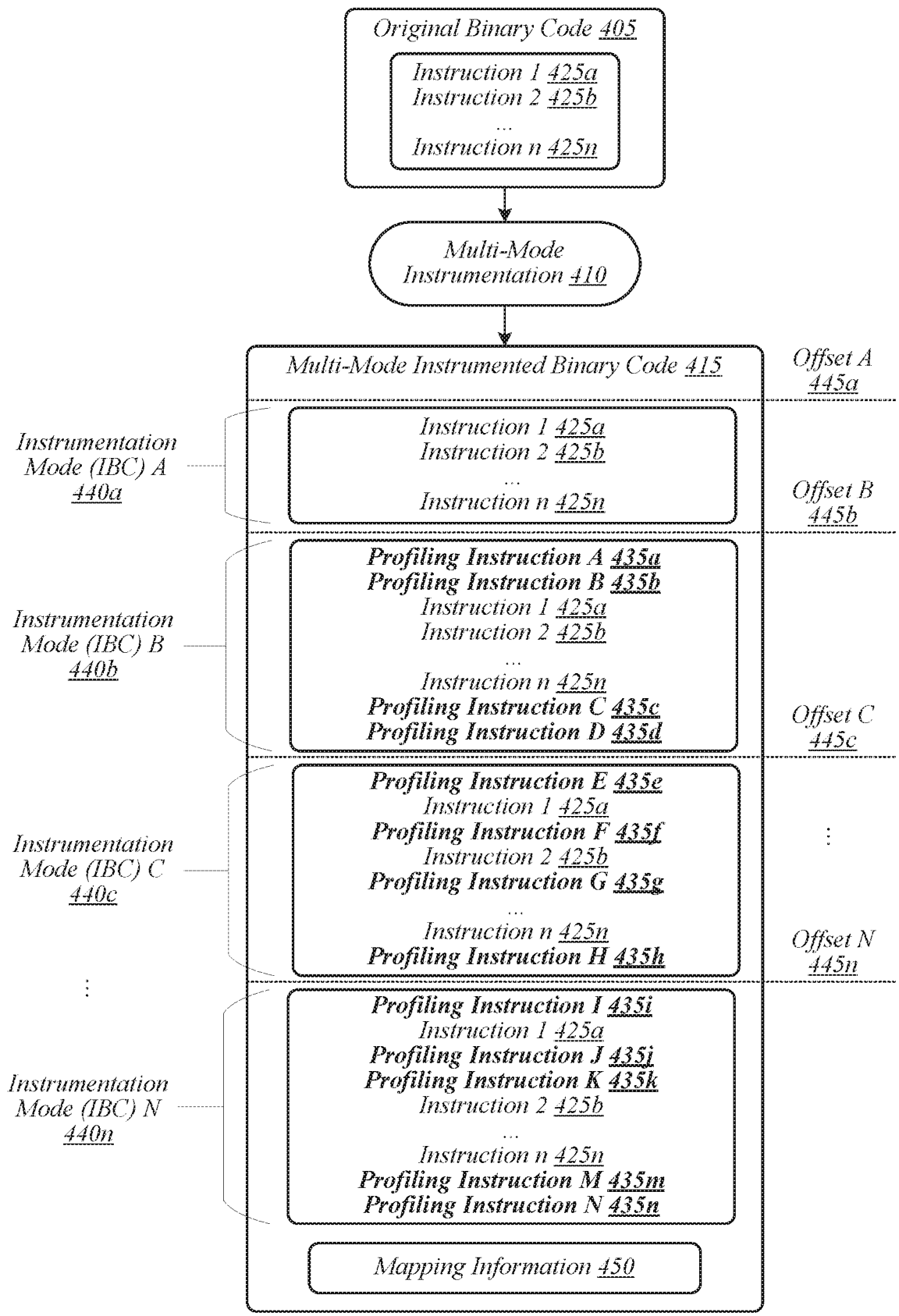
FIG. 4 illustrates a multi-mode IBC according to some embodiments.

In various embodiments, instead of providing the OBC 208 to the GPU hardware device 204 for execution, the GPU driver 120 may be configured to reroute the OBC 208 to the binary instrumentation module 112 so that the binary instrumentation module 112 can instrument the OBC 208 for performance profiling by inserting machine instruction-level profiling instructions into the OBC 208 to generate the example instrumented binary code (IBC) 124 (see, for instance, FIG. 4 for an example of IBC according to some embodiments). For example, the GPU driver 120 may read a flag or value in header information (e.g., a file header) of the OBC 208 indicating that the OBC 208 is non-instrumented object code. Based on the header information, the GPU driver 120 may determine that it should provide the OBC 208 to the binary instrumentation module 112 so that the binary instrumentation module 112 can instrument it with profiling instructions.

In some embodiments, the binary instrumentation process of the binary instrumentation module 112 may be driven by the profiling application 110, which receives the OBC 208 from the binary instrumentation module 112 and generates an example instrumentation schema 212 to specify how to instrument the OBC 208 with profiling instructions. The example profiling application 110 communicates with the binary instrumentation module 112 via the instrumentation schema 212 to control how the binary instrumentation module 112 performs desired instrumentation of specified profiling instructions on the OBC 208. The example instrumentation schema 212 includes performance profiling parameters in high-level programming language statements (e.g., the C programming language, the C++ programming language, etc.) or in any other suitable form (e.g., plain text, tabular form, extensible markup language (XML), etc.). For example, a high-level API-based user-specified performance profiling parameter in the instrumentation schema 212 may instruct the binary instrumentation module 112 to insert profiling instructions at particular locations of target object code that measure different aspects of high-level graphics operations (e.g., different aspects of a graphics renderer, different aspects of a graphics shader, different aspects of a graphics compute kernel, etc.). The different aspects may include the performance of one or more move instructions, one or more add instructions, one or more multiply instructions, one or more shift instructions, etc. and/or any combination of machine instruction-level instructions that make up different portions of high-level graphics operations.

Example profiling instruction insertion statements generated by the profiling application 110 in the instrumentation schema 212 may specify specific profiling instructions to insert at different code locations in target code (e.g., the OBC 208) and/or may specify performance parameters to measure for different specified code sequences in target code. For example, instruction insertion statements may specify to add a time-stamp start read (or counter start read) profiling instruction at an instruction insertion point before machine instruction A and add a time-stamp end read (or counter end read) profiling instruction at an instruction insertion point after machine instruction B. In such example, machine instructions A and B may refer to specific instructions in the OBC 208 that were identified by the profiling application 110 as inclusively bounding (e.g., start and end points) a code sequence to be profiled that includes the machine instructions A and B. In this manner, the resulting instrumentation of the OBC 208 with the time-stamp start/stop read (or counter start/stop read) profiling instructions added at corresponding instruction insertion points can be used to measure an execution duration (e.g., in a time unit of measure or in GPU clock cycles) of the bounded code sequence inclusive of the machine instructions A and B. Alternatively, an instruction insertion statement may specify to measure a particular performance parameter (e.g., an execution duration) for a code sequence bound by machine instructions A and B in the OBC 208. In such examples, the binary instrumentation module 112 may be provided with a profiling instruction look-up table or other type of instruction-reference guide that specifies what types of instructions to use for what types of performance parameters specified in the instrumentation schema 212 to be measured. For example, the profiling instruction look-up table or other type of profiling instruction-reference guide may indicate that an execution duration is measured by adding a time-stamp start read (or counter start read) profiling instruction at an instruction insertion point before a starting code sequence instruction (e.g., the machine instruction A) and add a time-stamp end read (or counter end read) profiling instruction at an instruction insertion point after an ending code sequence instruction (e.g., the machine instruction B).

During the binary instrumentation process, the binary instrumentation module 112 may obtain the target profiling modes, performance profiling parameter settings, and/or configurations from the instrumentation schema 212 to identify the types of profiling instructions to insert in the OBC 208 and locations in the OBC 208 at which to insert the profiling instructions to generate the IBC 124. The binary instrumentation module 112 may provide the IBC 124 to the GPU driver 120, and the GPU driver 120, in turn, routes the IBC 124 to the GPU hardware device 204 for execution by GPU hardware device 204. For example, the GPU driver 120 may read a flag or value in header information of the IBC 124 indicating that the IBC 124 is instrumented binary code. The GPU driver 120 may determine, based on the header information, to route the IBC 124 to the GPU hardware device 204 for execution.

Since the IBC 124 of the illustrated example includes the original code of the OBC 208 and the instrumented profiling instructions inserted by the binary instrumentation module 112, when the GPU hardware device 204 executes the IBC 124, the IBC 124 causes the GPU hardware device 204 to perform the graphics operations programmed in the OBC 208 and also causes the GPU hardware device 204 to generate and collect profiling data based on the instrumented profiling instructions. In the illustrated example of FIG. 2, the collected profiling data is shown as generated profiling data (GPD) 216. Since the instrumented profiling instructions are inserted at the machine instruction level, the IBC 124 causes the GPU hardware device 204 to generate the GPD 216 with fine granularity at the EU level and hardware thread level of the GPU hardware device 204. Based on the instrumented profiling instructions in the IBC 124, the GPU hardware device 204 stores the GPD 216 at one or more locations in memory 218 specified by the instrumented profiling instructions. For example, the instrumented profiling instructions may cause the GPU hardware device 204 to allocate memory space in the memory 218 at which to store the GPD 216. Because the binary instrumentation module 112 provided those instrumented profiling instructions, the binary instrumentation module 112 is aware of the memory spaces allocated in the memory 218 at which the GPU hardware device 204 stores the GPD 216. In this manner, the binary instrumentation module 112 can subsequently retrieve the GPD 216 from those allocated memory spaces in the memory 218.

During execution of the IBC 124 or after completion of execution of the IBC 124 (e.g., during or after execution of a portion of the application 114, during or after a draw command, after completing processing of a command buffer, etc.), the profiling application 110 may operate with the binary instrumentation module 112 to retrieve and access the GPD 216 from the memory 218. In the illustrated embodiment, the profiling application 110 may display performance measures based on the GPD 216 via a user interface. In some embodiments, the profiling application 110 may apply one or more different types of analyses to the GPD 216 and display results of such analyses via a user interface. For example, some analyses may provide performance statistics analysis such as informing a user of the best performing machine instruction routines in the object code relative to other machine instruction routines in the same object code. Other analyses may inform a user of possible improvements to the code such as loop unrolling, memory use optimization, etc.

In some embodiments, the GPU driver 120 may be provided with or otherwise associated with an application interface 252, a compiler interface 254, an instrumentation interface 256, and/or a GPU interface 258 to enable the GPU driver 120 to receive, arbitrate, and send ones of the OAC 206, OBC 208, and IBC 124 from and/or to ones of the example application 114, the example GPU compiler 202, the example GPU hardware device 204, and the example binary instrumentation module 112. The GPU driver 120 may be provided with the application interface 252 to receive the OAC 206 from the application 114. The GPU driver 120 may be provided with the compiler interface 254 to provide the OAC 206 to the GPU compiler 202 and to receive the OBC 208 from the GPU compiler 202. The GPU driver 120 may be provided with the instrumentation interface 256 to provide the OBC 208 to the binary instrumentation module 112 and to receive the IBC 124 from the binary instrumentation module 112. The GPU driver 120 may be provided with the GPU interface 258 to provide the IBC 124 to the GPU hardware device 204.

In various embodiments, the binary instrumentation module 112 may be provided with an example schema interface 262, an example instruction inserter 264, an example driver interface 266, and an example memory interface 268. The binary instrumentation module 112 may be provided with the schema interface 262 to receive the instrumentation schema 212 from the profiling application 110. The binary instrumentation module 112 may be provided with the instruction inserter 264 to insert profiling in the OBC 208 to generate the IBC 124. The binary instrumentation module 112 may be provided with the driver interface 266 to receive the OBC 208 from the GPU driver 120 and to provide the IBC 124 to the GPU driver 120. The binary instrumentation module 112 may be provided with the memory interface 268 to access the GPD 216 in the memory 218 and to provide the GPD 216 to the profiling application 110.

While an illustrative embodiment of implementing the instruction-level GPU profiling framework 108 and the GPU driver 120 is illustrated in FIGS. 1 and 2, one or more of the elements, processes and/or devices illustrated in FIGS. 1 and 2 may be combined, divided, re-arranged, omitted, eliminated and/or implemented in any other way. Further, the instruction-level GPU profiling framework 108, the profiling application 110, the binary instrumentation module 112, the GPU driver 120, the application 114, the GPU compiler 202, the GPU hardware 204, the memory 218, the application interface 252, the compiler interface 254, the instrumentation interface 256, the GPU interface 258, the schema interface 262, the instruction inserter 264, the driver interface 266, and/or the memory interface 268 of FIG. 1 and/or FIG. 2 may be implemented by hardware, software, firmware and/or any combination of hardware, software and/or firmware. Thus, for example, any of the instruction-level GPU profiling framework 108, the profiling application 110, the binary instrumentation module 112, the GPU driver 120, the example application 114, the GPU compiler 202, the GPU hardware 204, the memory 218, the application interface 252, the compiler interface 254, the instrumentation interface 256, the GPU interface 258, the schema interface 262, the instruction inserter 264, the driver interface 266, and/or the memory interface 268 may be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

Figure 3:
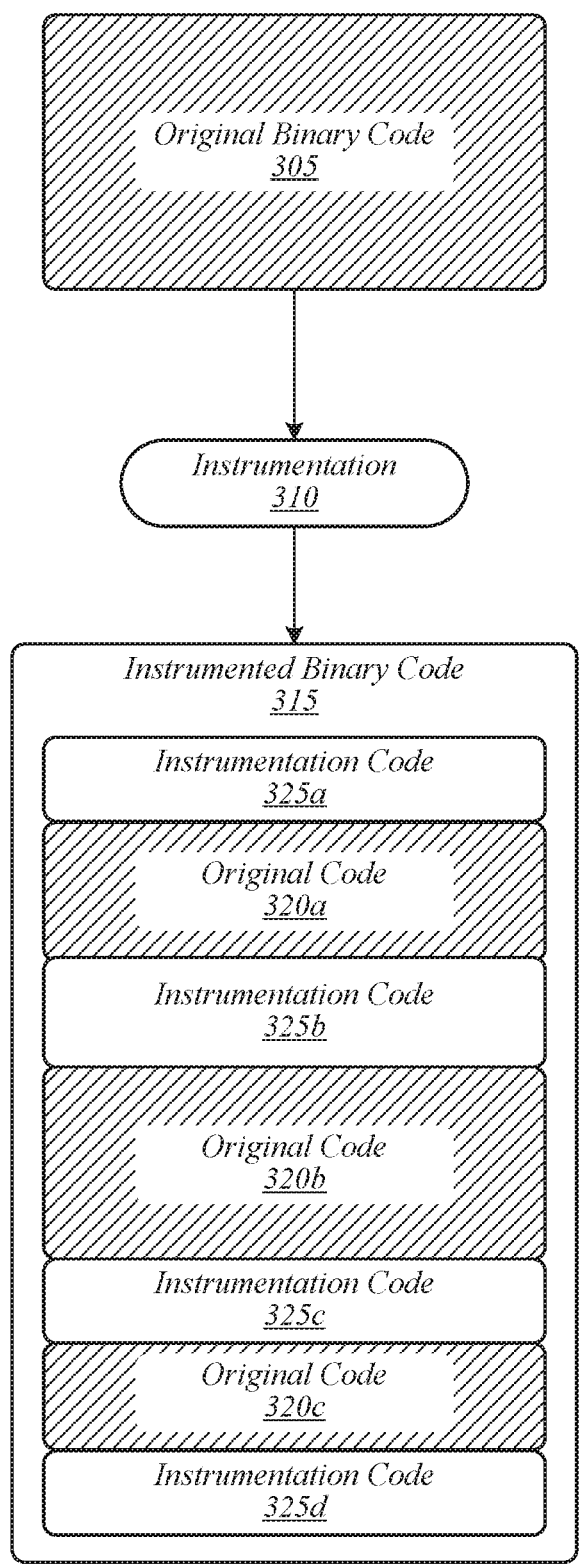
FIG. 3 depicts an illustrative single-mode instrumented binary code (IBC).

FIG. 3 depicts an illustrative single-mode IBC. As shown in FIG. 3, OBC 305 of a GPU application to be process is processed via an instrumentation process 310 to generate single-mode IBC 315. The single-mode IBC 315 may include segments of original code 320a-n interleaved with instrumentation code 325a-n. The single-mode IBC 315 may be profiled to analyze a single mode of interest, such as the number of cycles for a single run of the GPU application. Accordingly, the single-mode IBC allows for only one kind of instrumentation, since once the IBC 315 is passed to the driver, there is no chance to make alterations to the IBC 315 (for instance, the IBC 315 passed back to the driver via a binary instrumentation engine (BIE) will be run when the operating process (for example, a shader) is submitted for execution).

FIG. 4 illustrates a multi-mode IBC according to some embodiments. As depicted in FIG. 4, some embodiments may provide multi-mode instrumentation processes operative to generate multi-mode IBCs having binary code with a plurality of sections having no or substantially no flow control between them so that each section could have been sent as the IBC of other systems. Accordingly, some embodiments may generate a multi-mode IBV with several sections, with each section including one of a plurality of versions of instrumentations for different data profiling while maintaining the different versions in a single multi-mode IBC with no or substantially no flow control required between the different sections.

As depicted in FIG. 4, an OBC 405 for a GPU application may include a plurality of instructions 425a-n (for example, original code, such as original binary code). In the embodiment depicted in FIG. 4, the OBC 405 may be provided to a multi-mode instrumentation process 410 to be profiled according to various embodiments. The multi-mode instrumentation process 410 may operate to instrument the OBC 405 into a plurality of different instrumentation modes (IBCs or IBC modes) 440a-n, for instance in the form of at least one multi-mode IBC 415 structure. The multi-mode IBC 415 may be or may include a vector of instrumentation modes (or IBC modes) 440a-n, with each IBC mode 440a-n including at least a portion of the original instructions 425a-n and/or at least one profiling instruction 435a-n. In some embodiments, each instrumentation mode 440a-n may include all or substantially all of the original instructions 425a-n of the input OBC 405. In various embodiments, the profiling instructions 435a-n may operate to perform profiling functions. In exemplary embodiments, at least a portion of the IBC modes 440a-n may include profiling instructions 435a-n interleaved with the original instructions 425a-n in a different manner, but with the order of the original instructions 425a-n preserved or substantially preserved.

In various embodiments, an IBC mode 440a-n, such as IBC mode A 440a, may not include any profiling instructions 435a. Accordingly, an IBC mode 440a-n may include the native OBC 405 in its original or substantially original form. In this manner, the multi-mode IBC 415 may be used to run the native OBC. Accordingly, compilation time (such as double compilation time) may be saved by instrumenting the native OBC by itself (including more than once). In addition, because the multi-mode IBC 415 may include the native OBC, a shader or other operating process may be selectively run (see, for example, FIG. 6) on the native OBC, and selectively run on the (slower) multi-mode IBC 415 (slower due to the additional instrumented code) only when needed and only on commands of interest (for example, as specified via a profiling application). Accordingly, inefficiencies in profiling GPU applications due to always executing instrumented instructions, even when undesired, may be reduced or even eliminated.

In some embodiments, the original code 425a-n may be configured to perform an original process (i.e., an original process of OBC 405), and the profiling instructions (or instrumentation code) 435a-n may be configured to perform profiling functions. For example, IBC mode B 440b may include original code 425a-n interleaved with profiling instructions (i.e., instrumentation code) 435a-d. For instance, OBC 405 may be for a shader and IBC B 440b may be for profiling the number of cycles of a particular command (for instance, a draw command) for the shader. In another example, IBC mode C 440c may include original code 425a-n interleaved with profiling instructions 435e-h. For instance, OBC 405 may be for a shader and IBC mode C 440c may be for profiling the number of cycles of a particular command (for instance, a draw command) for the shader.

In various embodiments, each IBC mode 440a-n may be associated with one or more offsets 445a-n. In exemplary embodiments, the offset may be used by a profiling application to determine where to enter the multi-mode IBC 415 to execute a particular IBC mode 440a-n. In some embodiments, an offset 445a-n may indicate the first instruction of an IBC mode 440a-n. For example, to execute IBC mode A, execution may be started at offset A 445a, to execute IBC mode B, execution may be started at offset B 445b, and so on. In some embodiments, execution of an IBC mode 440a-n may begin at a starting offset of x and end at the ending offset x+1. In exemplary embodiments, an ending offset is not required as the code of the IBC mode 440a-n may handle exit from the IBC mode 440a-n without requiring an ending offset.

In various embodiments, mapping information 450 may include information mapping the offsets 445a-n to the IBC modes 440a-n that may be generated as part of the multi-mode instrumentation process 410. The mapping information 450 may include, among other things, information indicating which IBC modes 440a-n are associated with which offsets 445a-n. For example, the mapping information may indicate that in order to execute IBC mode C 440c, multi-mode IBC 415 must be executed starting at offset C 445c (i.e., the first instruction of IBC mode C 440c).

Accordingly, in some embodiments, a multi-mode instrumentation process 410 may receive or otherwise access an OBC 405 as input and generate a multi-mode IBC 415. The multi-mode IBC 415 may include a plurality of IBC modes 440a-n. An IBC mode 440a-n may include at least a portion of the original instructions 425a-n of the OBC 405. In some embodiments, an IBC mode 440a-n, such as IBC mode A, may include only original instructions 425a-n of the OBC 405. In various embodiments, an IBC mode 440a-n may include at least one original instruction 425a-n interleaved or otherwise combined with profiling instructions (instrumentation code) 435a-n. In exemplary embodiments, an IBC mode 440a-n may include all or substantially all of the original instructions 425a-n in the original order.

An IBC mode 440a-n that includes profiling instructions 435a-n (for example, IBC mode B 440b) may be executed to perform original work (for instance, via original instructions 425a-n) and profiling work (for instance, via profiling instructions 435a-n). The multi-mode IBC 415 may be a vector of IBC modes 440a-n, with each section (i.e., each IBC mode 440a-n) being independent (for instance, no flow control, communication, or other interaction between IBC modes 440a-n). In various embodiments, each IBC mode 440a-n may be located at its own offset 445a-n from the beginning of the multi-mode IBC 415 (i.e., offset A 445a or other starting location). For example, IBC mode B 445b is located between offset B 445b and offset C 445c.

Accordingly, in order to run a particular IBC mode (for example, counting processing cycles), a profiling application, driver, and/or the like may select the IBC mode 440a-n corresponding to the desired mode and initiate execution of the multi-mode IBC 415 at the associated offset 445a-n. For example, the profiling application, driver, and/or the like may look up the IBC mode 440a-n for the desired profiling function in the mapping information 450 and determine the corresponding offset 445a-n to execute the IBC mode 440a-n. Embodiments are not limited in this context.

Figure 5:
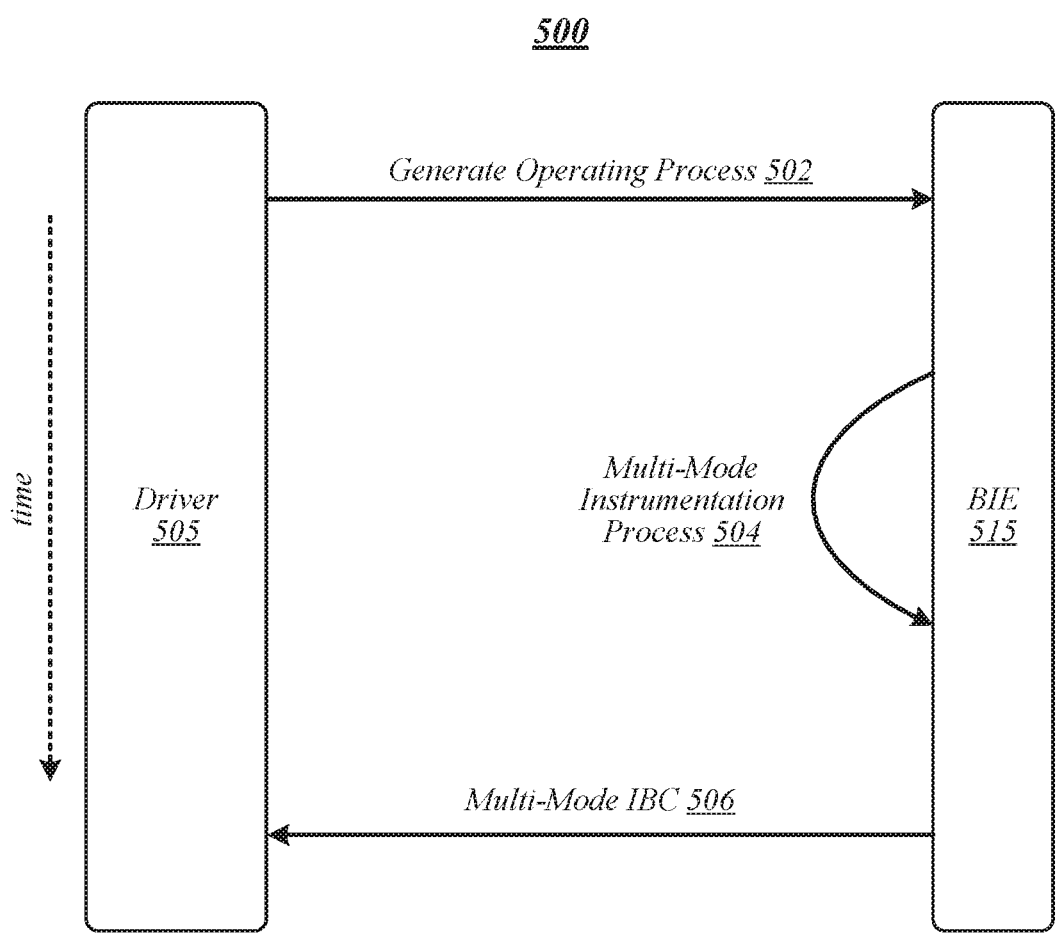
FIG. 5 illustrates an embodiment of a first logic flow.
Figure 6:
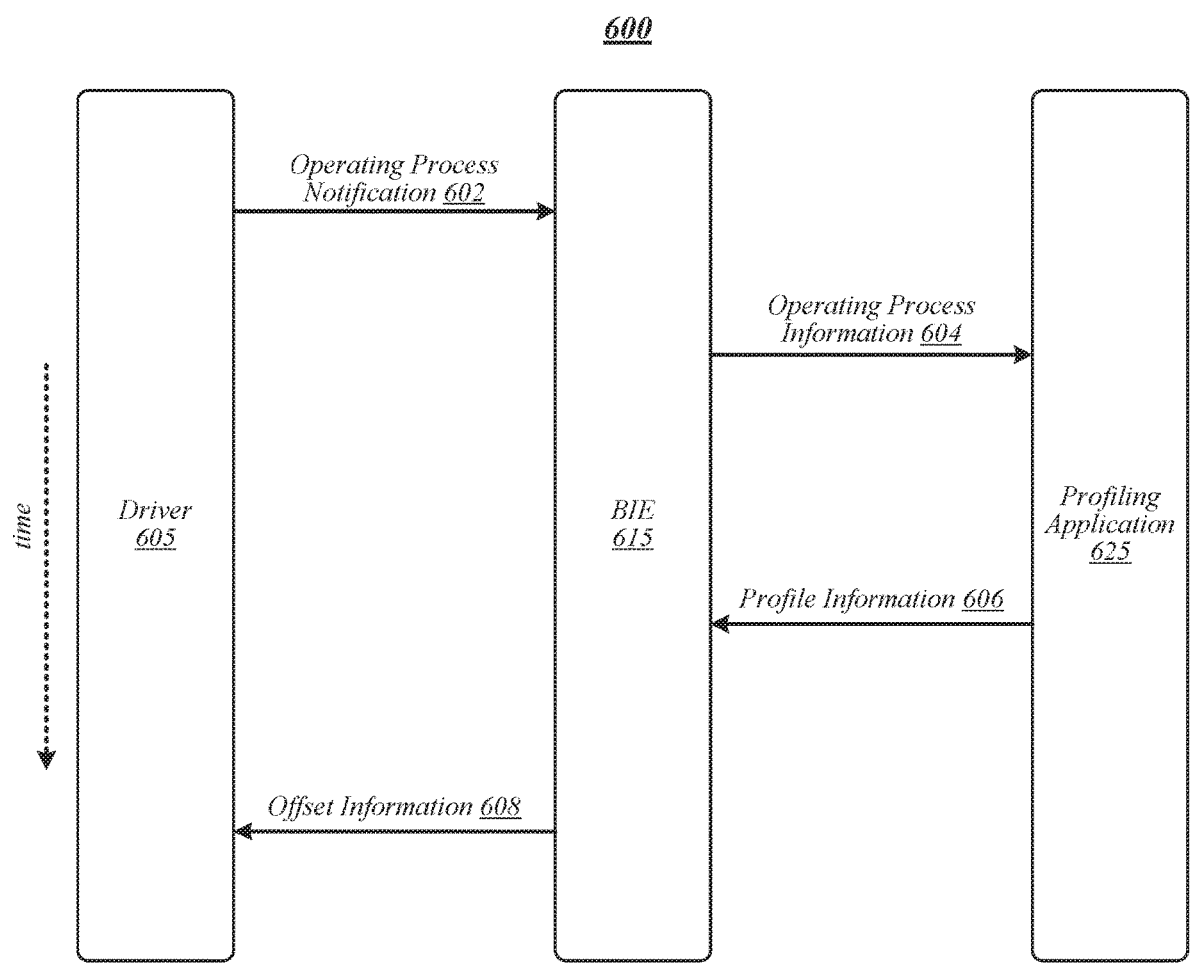
FIG. 6 illustrates an embodiment of a second logic flow.

FIGS. 5 and 6 illustrate flow diagrams for phases of generating and executing an operating process configured using a multi-mode IBC according to some embodiments. Referring to FIG. 4, therein is depicted a flow diagram for generating a multi-mode IBC. For example, FIG. 4 may depict a phase for generating an operating process, such as a shader build phase. In this phase, an instrumentation engine generates a multi-mode IBC based on profiling mode information provided by a profiling application. In some embodiments, the profiling mode information may include information indicating the types of modes and/or associated information to be included in the multi-mode IBC.

As shown in FIG. 5, a driver 505 may provide a message or signal to a BIE 515 to generate an operating process 502 (for example, a shaderBuildCallBack( ) function call for a shader operating process). For example, the driver 505 may provide a message 502 to the BIE 505 regarding a shader build. In some embodiments, the message 502 may include the operating process code, such as binary code, compiled binary code, and/or the like. In various embodiments, the message 502 may include operating process information, for example, shader metadata (for instance, shader type, SIMD width, hash-ID, and/or the like).

The BIE 515 may perform multi-mode instrumentation process 504 to generate a multi-mode IBC. For example, the BIE 515 may instrument the different versions of profiling as pre-programmed or otherwise specified by a profiling application. In various embodiments, the BIE 515 may generate the multi-mode IBC from all specified versions of the different profiling types or modes and generates a mapping from the mode or instrumentation type to an offset in the multi-mode IBC where the instrumentation mode of binary for the particular mode is located. In various embodiments, a profiling type or mode may be applied on a current operating process (for instance, a shader) if there exists a section in the multi-mode IBC that collects the profiling data in this stage. The BIE 515 may provide the multi-mode IBC 506 to the driver 505.

Referring to FIG. 6, therein is depicted a flow diagram for executing an operating process according to some embodiments. For example, FIG. 6 may depict a phase for running a shader. In this phase, a profiling application may, among other things, select which version or mode of instrumentation to run.

As shown in FIG. 6, a driver 605 may send an operating process notification 602 to a BIE 615. The operating process notification 602 may include a message associated with execution of an operating process and/or operating process information associated therewith. For example, the driver 605 may send the BIE 615 an operating process notification 602 that includes information associated with a shader run and operating process information (for instance, metadata) about the shader. In another example, the operating process notification 602 for a shader may be or may include a shaderRunCallback(metadata) function call. In various embodiments, the operating process information may include information associated with identifying and/or executing the operating process. The BIE 615 may send the operating process information 604 to a profiling application 625. For example, the operating process information 604 may be or may include a getInstrumentationType(metadata) function call for a shader.

The profiling application 625 may provide the BIE 615 with a mode or type of profiling requested for one or specified executions or runs of the operating process. For example, the profiling application 625 may send the BIE 615 with a type of profiling requested for a current run of the shader (for instance, number of cycles, execution path, and/or the like). The BIE 615 may determine the offset in the multi-mode IBC for executing the instrumentation mode for the specified profiling mode and provide the offset information 608 to the driver. In this manner, the driver 605 and/or other executing entities may execute the particular instrumentation mode associated with the offset information 608 (which corresponds to the specified profiling information 606). When the operating process has completed executing, the resulting profiling data may be provided to the profiling application (not shown) for post-processing and/or the like. In some embodiments, the resulting profiling data may be displayed to a user along with, for example, the associated instrumentation mode(s).

Figure 7:
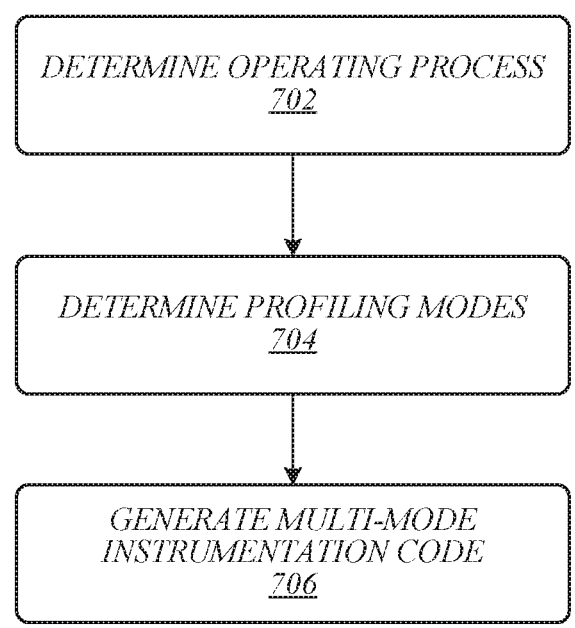
FIG. 7 illustrates an embodiment of a third logic flow.

FIG. 7 illustrates an embodiment of a logic flow 700. The logic flow 700 may be representative of some or all of the operations executed by one or more embodiments described herein, such as operating environment 100, operating environment 200, and/or components thereof. In some embodiments, the logic flow 700 may be representative of some or all of the operations of executing an operating process. In some embodiments, a compute process may include, without limitation, a kernel, a compute process, and/or a shader.

The logic flow 700 may determine an operating process at block 702. For example, a user may submit an operating process of a GPU application to be profiled via a profiling application. For example, the user may specify profiling of a particular shader of a graphics application being executed on a GPU. At block 704, the logic flow 700 may determine profiling modes. For example, a user may submit one or more profiling modes via a profiling application to be profiled for the operating process. In another example, the one or more profiling modes may include at least one default profiling mode determined by the profiling application. For example, the profiling application may determine a default profiling mode based on the type of operating process (for instance, a first set of default profiling modes for a first shader, a second set of default profiling modes for a second shader, and so on). In another example, the profiling application may determine one or more profiling modes based on historical data, such as setting a number of cycles profiling mode responsive to a number of cycles of a shader being over a threshold. Embodiments are not limited in this context.

The logic flow 700 may generate multi-mode instrumentation code at block 706. For example, the BIE 5015 may perform a multi-mode instrumentation process 504 according to some embodiments to generate multi-mode instrumentation code, such as multi-mode IBC 415.

Figure 8:
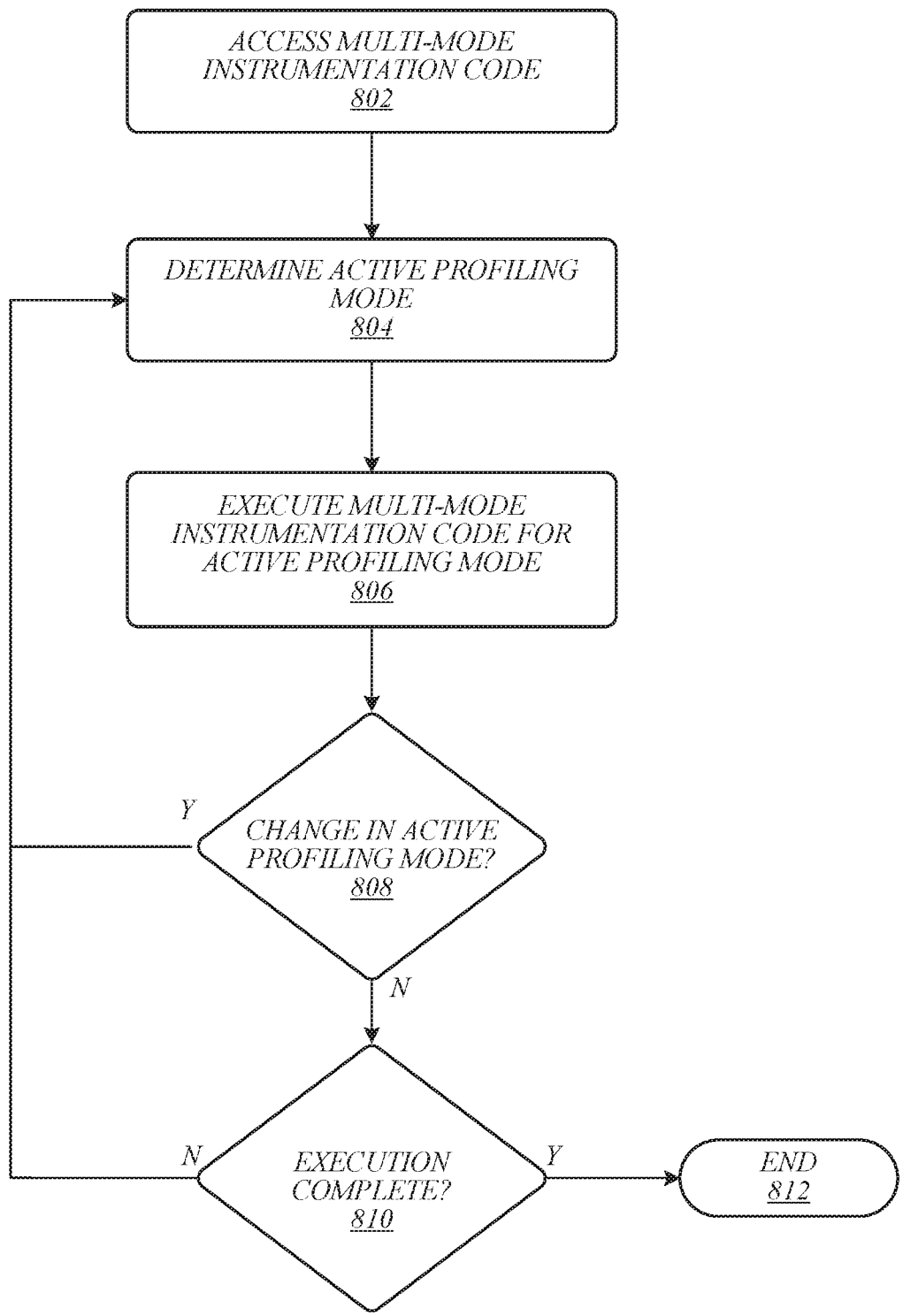
FIG. 8 illustrates an embodiment of a fourth logic flow.

FIG. 8 illustrates an embodiment of a logic flow 800. The logic flow 800 may be representative of some or all of the operations executed by one or more embodiments described herein, such as operating environment 100, operating environment 200, and/or components thereof. In some embodiments, the logic flow 800 may be representative of some or all of the operations of executing an operating process. In some embodiments, a compute process may include, without limitation, a kernel, a compute process, and/or a shader.

The logic flow 800 may access multi-mode instrumentation code at block 802. For example, the logic flow 800 may access the multi-mode IBC 415 for an operating process (for instance, a shader) being executed on a GPU. At block 804, the logic flow 800 may determine an active profiling mode. For example, a user may submit an active profiling mode via a profiling application, such as a native profiling mode (for instance, to execute native OBC), a first profiling mode (for instance, to analyze a number of cycles of an operating process), and so on. In some embodiments, the active profiling mode may include a plurality or sequence of profiling modes to be executed in sequence. For example, mode A instrumentation 440*a* may be executed and the resulting profiling data provided to the user, then mode N instrumentation 440*n* may be executed and the resulting profiling data provided to the user, and so on.

At block 806, the logic flow 800 may execute the multi-mode instrumentation code for the active profiling mode. For example, if mode A is active, the logic flow 800 may execute the code associated with mode A instrumentation 440*a*. When execution of the multi-mode instrumentation code for the active mode is complete, the logic flow 800 may determine whether there has been a change in the active profiling mode at block 808. If there has been a change in the active profiling mode, the logic flow 800 may determine the active profiling mode at block 804 and then execute the multi-mode instrumentation code for the active profiling mode at block 806. If there has not been a change in the active profiling mode, the logic flow 800 may determine whether execution is complete at block 810. If execution is complete, the logic flow 800 may end execution at block 812. If execution is not complete, the logic flow 800 may return to determining the active profiling mode at block 804.

Figure 9:
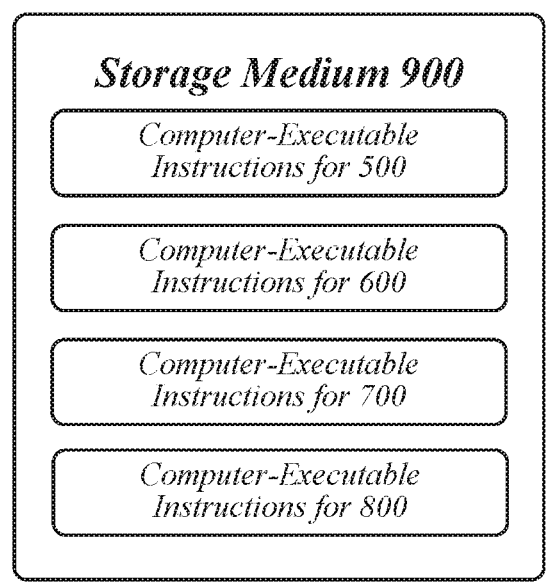
FIG. 9 illustrates an example of a storage medium.

FIG. 9 illustrates an example of a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flows 500, 600, 700, and/or 800. Examples of a computer-readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
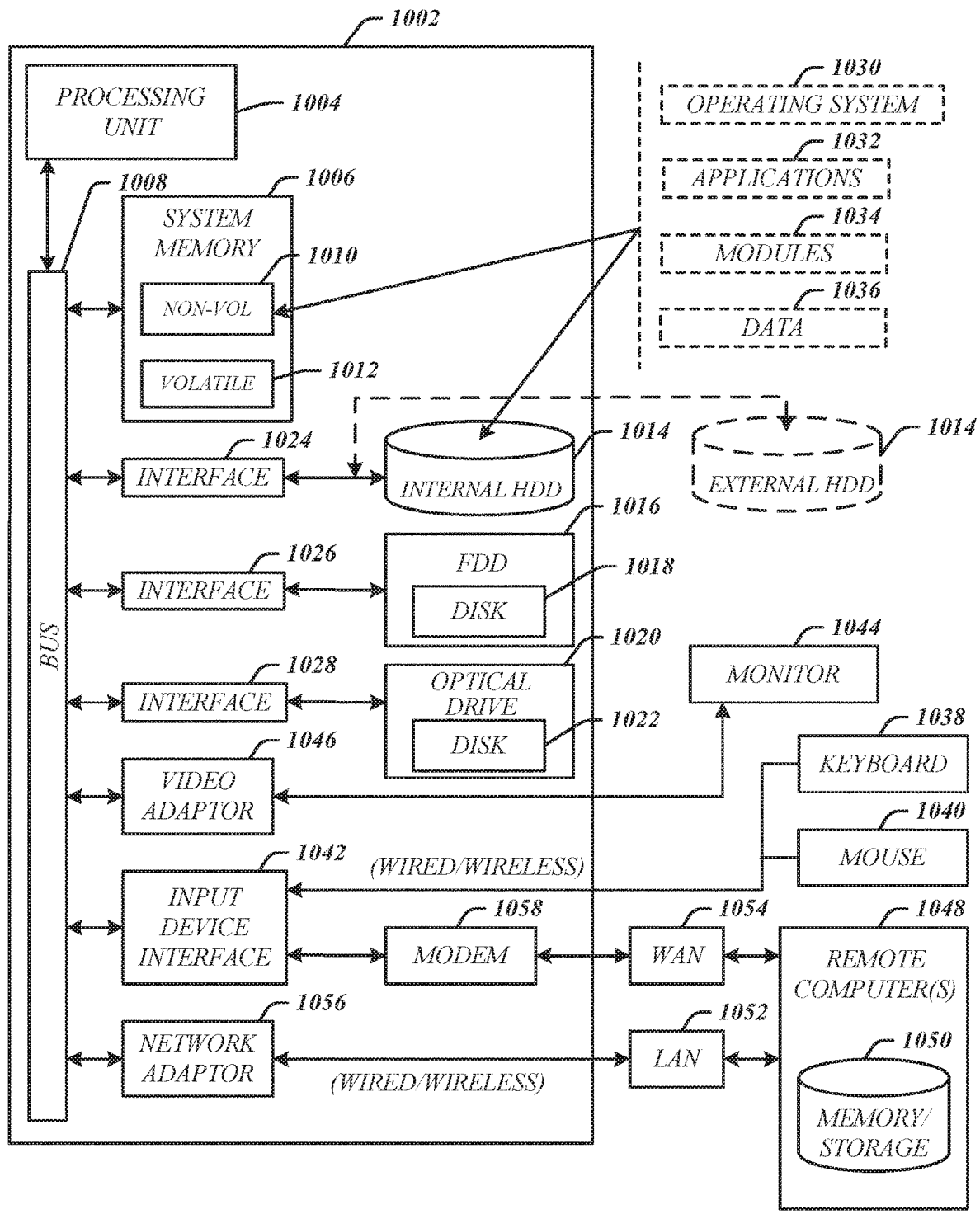
FIG. 10 illustrates an embodiment of a computing architecture.

FIG. 10 illustrates an embodiment of an exemplary computing architecture 1000 suitable for implementing various embodiments as previously described. In various embodiments, the computing architecture 1000 may comprise or be implemented as part of an electronic device. In some embodiments, the computing architecture 1000 may be representative, for example, of operating environment 100, operating environment 200, and/or components thereof. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 may be or may include processing circuitry. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of operating environment 100, operating environment 200, and/or components thereof.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1384 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following include non-limiting example embodiments:

Example 1 is an apparatus, comprising at least one memory comprising instructions, and a processor coupled to the at least one memory, the processor to execute the instructions to determine a plurality of profiling modes for profiling an operating process of a graphics processing unit (GPU) application, access original binary code for the GPU application, and generate a multi-mode instrumented binary code comprising a plurality of instrumentation modes, each of the plurality of instrumentation modes corresponding to at least one of the plurality of profiling modes.

Example 2 is the apparatus of Example 1, the operating process comprising at least one of a compute kernel or a shader.

Example 3 is the apparatus of Example 1, at least one of the plurality of instrumentation modes comprising at least a portion of the original binary code and instrumentation code corresponding to at least one of the plurality of profiling modes.

Example 4 is the apparatus of Example 1, at least one of the plurality of instrumentation modes comprising only original binary code without instrumentation code.

Example 5 is the apparatus of Example 1, the plurality of profiling modes comprising at least one of a number of cycles, a trace path, and generated data.

Example 6 is the apparatus of Example 1, each of the plurality of instrumentation modes associated with an offset operative to indicate an execution entry point for a corresponding instrumentation mode.

Example 7 is the apparatus of Example 1, the processor to execute the instructions to determine an active profiling mode.

Example 8 is the apparatus of Example 7, the processor to execute the instructions to execute one of the plurality of instrumentation modes corresponding to the active profiling mode.

Example 9 is the apparatus of Example 8, the processor to execute the instructions to present profiling data resulting from execution of the one of the plurality of instrumentation modes.

Example 10 is a system, comprising the apparatus according to any of claims 1-9, and at least one network interface.

Example 11 is a method, comprising determining a plurality of profiling modes for profiling an operating process of a graphics processing unit (GPU) application, accessing original binary code for the GPU application, and generating a multi-mode instrumented binary code comprising a plurality of instrumentation modes, each of the plurality of instrumentation modes corresponding to at least one of the plurality of profiling modes.

Example 12 is the method of Example 11, the operating process comprising at least one of a compute kernel or a shader.

Example 13 is the method of Example 11, at least one of the plurality of instrumentation modes comprising at least a portion of the original binary code and instrumentation code corresponding to at least one of the plurality of profiling modes.

Example 14 is the method of Example 11, at least one of the plurality of instrumentation modes comprising only original binary code without instrumentation code.

Example 15 is the method of Example 11, the plurality of profiling modes comprising at least one of a number of cycles, a trace path, and generated data.

Example 16 is the method of Example 11, each of the plurality of instrumentation modes associated with an offset operative to indicate an execution entry point for a corresponding instrumentation mode.

Example 17 is the method of Example 11, comprising determining an active profiling mode.

Example 18 is the method of Example 17, comprising executing one of the plurality of instrumentation modes corresponding to the active profiling mode.

Example 19 is the method of Example 18, comprising presenting profiling data resulting from execution of the one of the plurality of instrumentation modes.

Example 20 is a non-transitory computer-readable storage medium that stores computer-executable instructions for execution by processing circuitry of a computing device, the computer-executable instructions, when executed, to cause the computing device to determine a plurality of profiling modes for profiling an operating process of a graphics processing unit (GPU) application, access original binary code for the GPU application, and generate a multi-mode instrumented binary code comprising a plurality of instrumentation modes, each of the plurality of instrumentation modes corresponding to at least one of the plurality of profiling modes.

Example 21 is the non-transitory computer-readable storage medium of Example 20, at least one of the plurality of instrumentation modes comprising at least a portion of the original binary code and instrumentation code corresponding to at least one of the plurality of profiling modes.

Example 22 is the non-transitory computer-readable storage medium of Example 20, at least one of the plurality of instrumentation modes comprising only original binary code without instrumentation code.

Example 23 is the non-transitory computer-readable storage medium of Example 20, each of the plurality of instrumentation modes associated with an offset operative to indicate an execution entry point for a corresponding instrumentation mode.

Example 24 is the non-transitory computer-readable storage medium of Example 20, the computer-executable instructions, when executed, to cause the computing device to determine an active profiling mode.

Example 25 is the non-transitory computer-readable storage medium of Example 24, the computer-executable instructions, when executed, to cause the computing device to execute one of the plurality of instrumentation modes corresponding to the active profiling mode.

Example 26 is the non-transitory computer-readable storage medium of Example 25, the computer-executable instructions, when executed, to cause the computing device to present profiling data resulting from execution of the one of the plurality of instrumentation modes.

Example 27 is an apparatus, comprising at least one memory means comprising instructions, and a processor means coupled to the at least one memory means, the processor means to execute the instructions to determine a plurality of profiling modes for profiling an operating process of a graphics processing unit (GPU) application, access original binary code for the GPU application, and generate a multi-mode instrumented binary code comprising a plurality of instrumentation modes, each of the plurality of instrumentation modes corresponding to at least one of the plurality of profiling modes.

Example 28 is the apparatus of Example 1, the operating process comprising at least one of a compute kernel or a shader.

Example 29 is the apparatus of Example 1, at least one of the plurality of instrumentation modes comprising at least a portion of the original binary code and instrumentation code corresponding to at least one of the plurality of profiling modes.

Example 30 is the apparatus of Example 1, at least one of the plurality of instrumentation modes comprising only original binary code without instrumentation code.

Example 31 is the apparatus of Example 1, the plurality of profiling modes comprising at least one of a number of cycles, a trace path, and generated data.

Example 32 is the apparatus of Example 1, each of the plurality of instrumentation modes associated with an offset operative to indicate an execution entry point for a corresponding instrumentation mode.

Example 33 is the apparatus of Example 1, the processor means to execute the instructions to determine an active profiling mode.

Example 34 is the apparatus of Example 7, the processor means to execute the instructions to execute one of the plurality of instrumentation modes corresponding to the active profiling mode.

Example 35 is the apparatus of Example 8, the processor means to execute the instructions to present profiling data resulting from execution of the one of the plurality of instrumentation modes.

Example 36 is a system, comprising the apparatus according to any of claims 27-35, and at least one network interface.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   at least one memory comprising instructions; and
   a processor coupled to the at least one memory, the processor to execute the instructions to:
   determine a plurality of profiling modes for profiling an operating process of a graphics processing unit (GPU) application,
   access original binary code for the GPU application, and
   instrument the original binary code with profiling instructions inserted at different code locations in the original binary code as specified by an instrumentation schema to generate a multi-mode instrumented binary code from the original binary code, the multi-mode instrumented binary code comprising a plurality of instrumentation modes, each of the plurality of instrumentation modes to generate profiling data corresponding to at least one of the plurality of profiling modes.

2. The apparatus of claim 1, the operating process comprising at least one of a compute kernel or a shader.

3. The apparatus of claim 1, at least one of the plurality of instrumentation modes comprising at least a portion of the original binary code and instrumentation code corresponding to at least one of the plurality of profiling modes.

4. The apparatus of claim 1, at least one of the plurality of instrumentation modes comprising only original binary code without instrumentation code.

5. The apparatus of claim 1, the plurality of profiling modes comprising at least one of a number of cycles, a trace path, and generated data.

6. The apparatus of claim 1, each of the plurality of instrumentation modes associated with an offset operative to indicate an execution entry point for a corresponding instrumentation mode.

7. The apparatus of claim 1, the processor to execute the instructions to determine an active profiling mode.

8. The apparatus of claim 7, the processor to execute the instructions to execute one of the plurality of instrumentation modes corresponding to the active profiling mode.

9. The apparatus of claim 8, the processor to execute the instructions to present profiling data resulting from execution of the one of the plurality of instrumentation modes.

10. A method, comprising:
    determining a plurality of profiling modes for profiling an operating process of a graphics processing unit (GPU) application;
    accessing original binary code for the GPU application; and
    instrumenting the original binary code with profiling instructions inserted at different code locations in the original binary code as specified by an instrumentation schema to generate a multi-mode instrumented binary code from the original binary code, the multi-mode instrumented binary code comprising a plurality of instrumentation modes, each of the plurality of instrumentation modes to generate profiling data corresponding to at least one of the plurality of profiling modes.

11. The method of claim 10, the operating process comprising at least one of a compute kernel or a shader.

12. The method of claim 10, at least one of the plurality of instrumentation modes comprising at least a portion of the original binary code and instrumentation code corresponding to at least one of the plurality of profiling modes.

13. The method of claim 10, at least one of the plurality of instrumentation modes comprising only original binary code without instrumentation code.

14. The method of claim 10, the plurality of profiling modes comprising at least one of a number of cycles, a trace path, and generated data.

15. The method of claim 10, each of the plurality of instrumentation modes associated with an offset operative to indicate an execution entry point for a corresponding instrumentation mode.

16. The method of claim 10, comprising determining an active profiling mode.

17. The method of claim 16, comprising executing one of the plurality of instrumentation modes corresponding to the active profiling mode.

18. The method of claim 17, comprising presenting profiling data resulting from execution of the one of the plurality of instrumentation modes.

19. A non-transitory computer-readable storage medium that stores computer-executable instructions for execution by processing circuitry of a computing device, the computer-executable instructions, when executed, to cause the computing device to:
    determine a plurality of profiling modes for profiling an operating process of a graphics processing unit (GPU) application;
    access original binary code for the GPU application; and
    instrument the original binary code with profiling instructions inserted at different code locations in the original binary code as specified by an instrumentation schema to generate a multi-mode instrumented binary code from the original binary code, the multi-mode instrumented binary code comprising a plurality of instrumentation modes, each of the plurality of instrumentation modes to generate profiling data corresponding to at least one of the plurality of profiling modes.

20. The non-transitory computer-readable storage medium of claim 19, at least one of the plurality of instrumentation modes comprising at least a portion of the original binary code and instrumentation code corresponding to at least one of the plurality of profiling modes.

21. The non-transitory computer-readable storage medium of claim 19, at least one of the plurality of instrumentation modes comprising only original binary code without instrumentation code.

22. The non-transitory computer-readable storage medium of claim 19, each of the plurality of instrumentation modes associated with an offset operative to indicate an execution entry point for a corresponding instrumentation mode.

23. The non-transitory computer-readable storage medium of claim 19, the computer-executable instructions, when executed, to cause the computing device to determine an active profiling mode.

24. The non-transitory computer-readable storage medium of claim 23, the computer-executable instructions, when executed, to cause the computing device to execute one of the plurality of instrumentation modes corresponding to the active profiling mode.

25. The non-transitory computer-readable storage medium of claim 24, the computer-executable instructions, when executed, to cause the computing device to present profiling data resulting from execution of the one of the plurality of instrumentation modes.

* * * * *